Patented Feb. 14, 1933

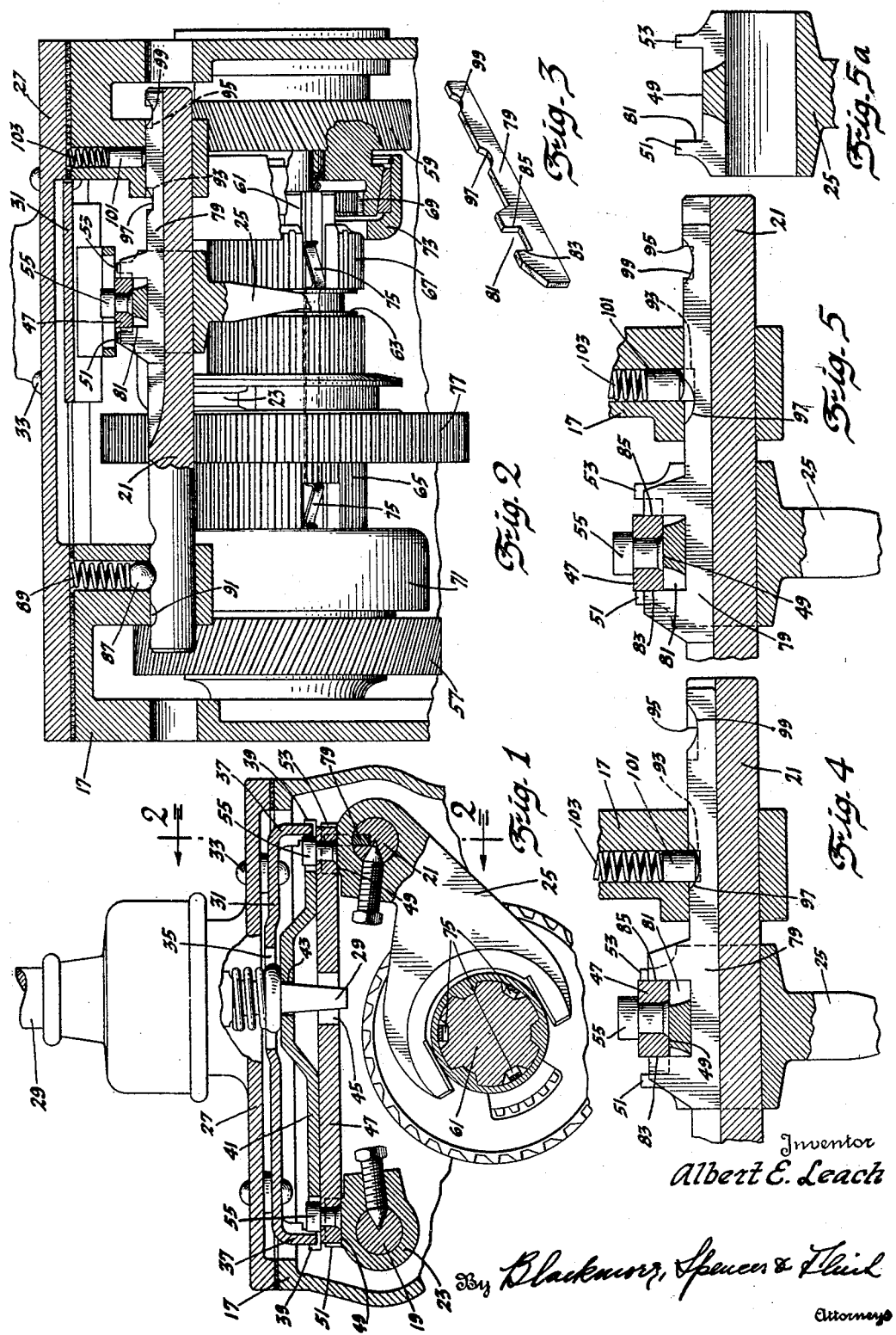

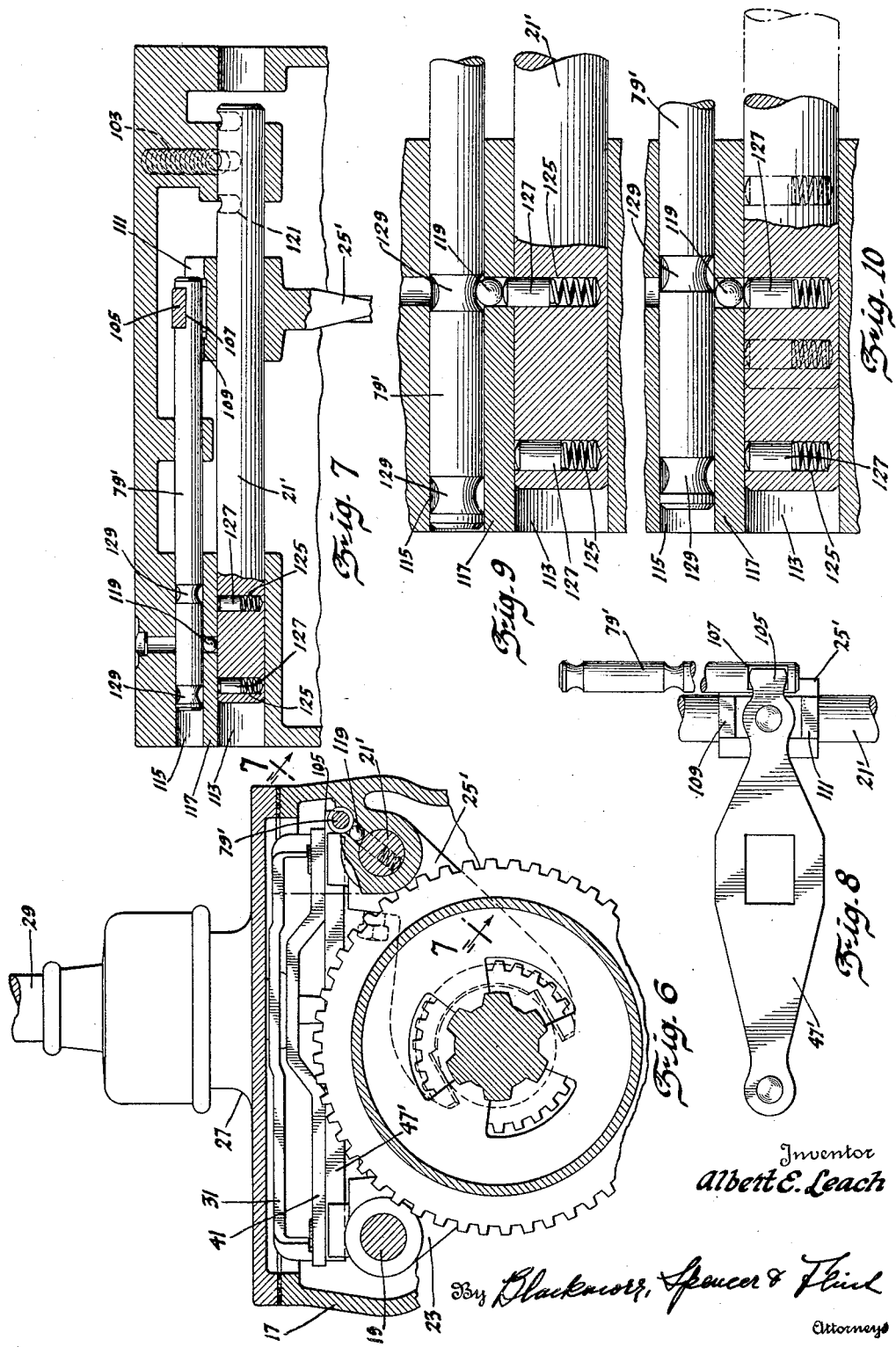

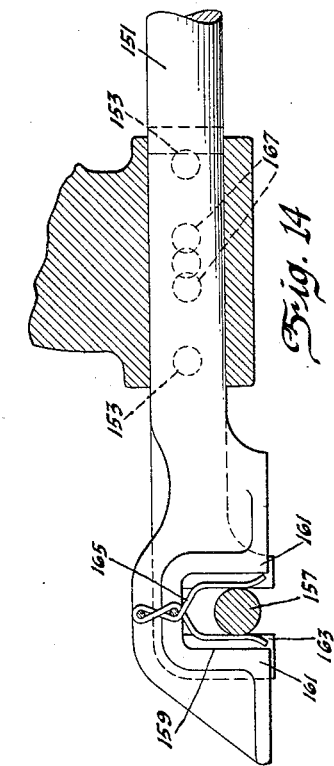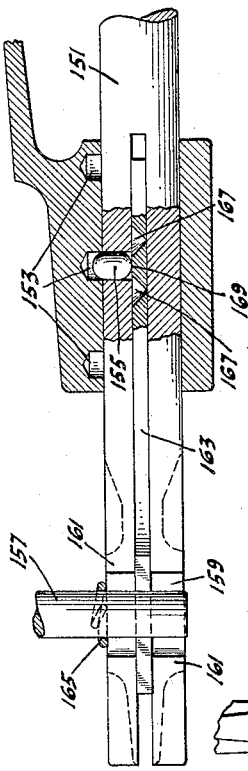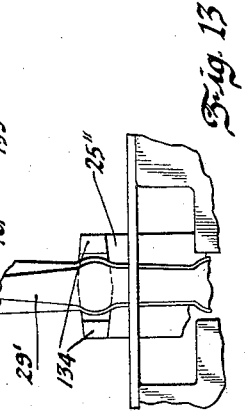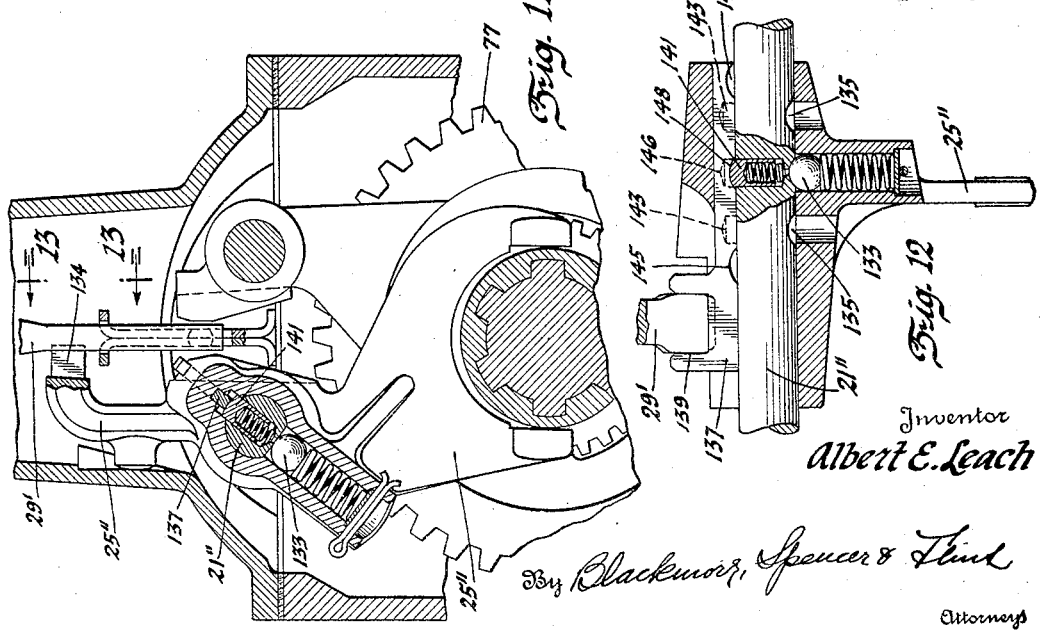

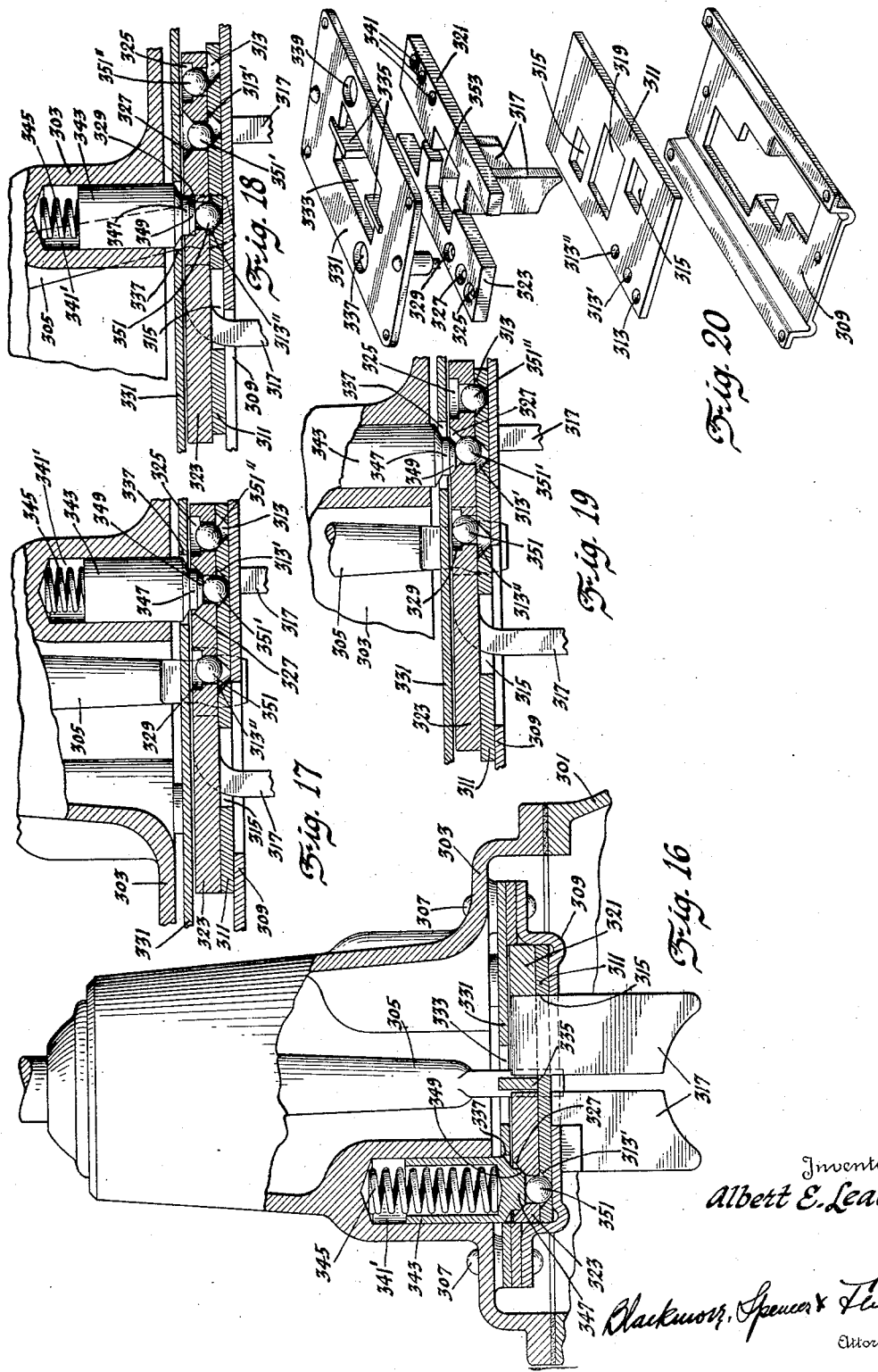

1,897,851

UNITED STATES PATENT OFFICE

ALBERT E. LEACH, OF ROYAL OAK, MICHIGAN, ASSIGNOR TO GENERAL MOTORS CORPORATION, OF DETROIT, MICHIGAN, A CORPORATION OF DELAWARE

GEAR SHIFT LOCK

Application filed May 12, 1932. Serial No. 610,797.

This invention relates to change speed transmission and is especially intended for use with motor vehicles.

An object of the invention is to provide means to lock the parts when shifted to driving positions to the end that the elements effecting selected driving ratios may not become disconnected except when external shifting means is actuated.

The provision of a simple and inexpensive structure to accomplish the above object constitutes a secondary object of the invention.

Other objects and advantages will appear from the following description.

Fig. 1 is a transverse section through a change speed mechanism having my invention embodied therein.

Fig. 2 is a longitudinal section on line 2—2 of Fig. 1.

Fig. 3 is a perspective of a detail.

Fig. 4 shows a portion of the mechanism in longitudinal section, the section corresponding to that of Fig. 2 but having the parts in changed relation.

Fig. 5 is a similar view in section of the same parts in still another position of adjustment.

Fig. 5a is a detail view of the fork in section.

Fig. 6 is a transverse section showing a modified form of the invention.

Fig. 7 is a section on line 7—7 of Fig. 6.

Fig. 8 is a top plan view of the shifting lever and related parts.

Fig. 9 is a longitudinal section showing one position of adjustment.

Fig. 10 is a similar view showing the parts in another position of adjustment.

Fig. 11 is a transverse section of a third embodiment of the invention.

Fig. 12 is a longitudinal section through the shift fork and rod.

Fig. 13 is a view as seen from line 13—13 on Fig. 11. Fig. 14 is a top plan view of the operating parts used in still another embodiment.

Fig. 15 is a view in elevation, partly in section, the view being at right angles to that of Fig. 14.

Fig. 16 is a view in elevation, partly in section, of still another embodiment.

Fig. 17 is a longitudinal section showing the parts in one position of adjustment.

Fig. 18 is a similar view with the parts in a second position of adjustment.

Fig. 19 is a similar view with the parts slightly moved from their neutral position.

Fig. 20 is a perspective of certain parts in disassembled relation.

In Fig. 1 a change speed housing is represented by numeral 17. Within the housing are slidable rods 19 and 21. These rods carry substantially conventional shift forks 23 and 25. Extending through the top 27 of the housing is a shift lever 29. Within the housing and just beneath the top is a guide bar 31 which is secured to the top as at 33. The guide bar has a central opening 35 to permit free movement of the lever 29. The guide bar 31 has down-turned ends 37 received within slots 39 provided in the ends of an interlocking bar 41. This bar 41 is moved transversely by the transverse movements of lever 29, the latter extending through an opening 43 therein. As is usual in such constructions, the opening 43 has a sufficient longitudinal extent, not shown in the drawings, to permit the necessary longitudinal movements of the lever. Because of the end engagement of bar 41 with the guide bar 31, the former is restricted to transverse movements only. Lever 29 is received within an opening 45 of an operating lever 47. From Fig. 1 it will be seen that the opening 45 is such as to provide lever 29 with the freedom for limited transverse movement. There is no provision for longitudinal movement between the lever 29 and the lever 47. The ends of lever 47 rest on flat surfaces 49 of the two forks 23 and 25 and project between upstanding lugs on the said forks. On fork 25 these lugs are designated by numerals 51 and 53. At each end of lever 47 is an upstanding pin 55.

When lever 29 is moved transversely it moves the interlocking plate 41 in the same direction. There are notches in the bases of the slots 39 to be engaged by the one or the other of the pins 55. For example, if lever 29 is moved toward the left it carries plate 41 to the left and engages its notch with the pin 55 at the left end of lever 47. When, thereafter, lever 29 is rocked in a longitudinal direction, the left end of lever 47 is held from longitudinal movement, and its right end (the pin 55 at that end being released from the notch) is free to move longitudinally about its anchored end as a center to shift fork 25. Fork 23 is similarly shifted by a reverse movement of the lever 29.

The above construction is a part of a well-known change speed transmission and is not claimed herein. The shifting of the rods shifts clutches and gears in a well-known manner to effect the several driving ratios. The system illustrated may be briefly described. Numeral 59 is a helical gear on the input shaft and is operable to rotate a countershaft (not shown) by meshing with a corresponding gear on the countershaft. At the opposite end of the countershaft another similar gear is to engage and drive a gear 57 which is rotatably mounted on the output shaft 61 adjacent the rear end of the housing. A slidable clutch element 63 is moved by the fork 25. It has a nonrotatable relation with the output shaft 61. It is provided with clutch teeth 67 and 65 to engage clutch teeth 69 on the input shaft and teeth (not shown) on the gear 57. At 71 and 73 are synchronizing clutch elements actuated by the initial movement of the member 63 through the instrumentality of yielding means 75. Slidable but non-rotatable on the periphery of member 63 is a driven gear 77 which is reciprocated by fork 23. This gear is to engage the low speed driving gear and the reverse idler in substantially the usual way.

The improvement described in this application relates to a provision for maintaining the clutches (67, 69 for example) in engagement when once meshed until positively released by the action of the shift lever.

The rod 21 and the fork 25 are slotted to slidably carry a lock bar 79. Lock bar 79 has a notch 81, the vertical walls 83 and 85 of which are dimensioned to snugly fit the end of lever 47. It will be observed that the space between the lugs 51 and 53 is somewhat in excess of the space between the walls 83 and 85 so that there may be a slidable movement of 79 prior to the movement of fork 25 and the rod 21. In the housing there is provided an opening in which is located a ball 87 actuated by a spring 89 to engage recesses 91 in the rod 21, these recesses corresponding to the several positions of adjustment of the rod and fork. In addition to this detent provision the rod 21 has notches 93 and 95 provided with straight sided walls. The lock bar has notches 97 and 99 formed with curved walls as shown in Fig. 3 to Fig. 5. These notches are so located that in the neutral position of the fork 25 as shown in Fig. 2 the adjacent ends of the walls of notches 97 and 99 coincide with the adjacent ends of the notches 93 and 95. The notches 97 and 99 are, however, of greater length and their remote ends lie beyond the remote ends of the notches 93 and 95. Within the housing is a plunger 101 actuated by a spring 103. This plunger may be located out of the several notches as in Fig. 2 or it may enter the one or the other of the notches as shown, for example, in Fig. 4. Fig. 4 shows the plunger deeply seated in notch 93. Since the notch 93 has straight walls the plunger locks the rod 21 and the fork 25 from reciprocation unless external means is employed to raise the plunger against the tension of the spring.

Fig. 2 illustrates the parts in their neutral position. If lever end 47 is moved to the right in this figure the lock bar is first moved since it is engaged by lever 47 and since there is a clearance between 47 and the wall 53 which must be overcome. In so moving the lock bar the notch 97 is made to register with notch 93 so that the mid portions of the notches coincide. At that time the lever 47 picks up the wall 53 of the fork 25 and both rod 21 with the fork and the lock bar move together until the pin 101 is forced into notch 93, this being permitted by the relative position of the notches as explained above. If now a reverse shift toward the other position is made the first action is to shift lock bar 79 to the left before rod 21 is picked up. In doing so the angular wall 97 pushes the plunger 101 up out of the notch 93. By the time the plunger 101 is wholly removed from the notch 93, both the rod 21 and the lock bar 79 move together. In the movement described notches 95 and 99 have been brought into registration so that the plunger 101 may enter notch 95 and lock the shift fork and bar 21 in its new position of adjustment.

The above arrangement prevents any unintended disengagement of the clutches. Release is at once effected by the movement of the shift lever in the usual way.

Fig. 6 shows a second embodiment of the invention. It is used with similar transmission parts which are, therefore, similarly indicated. Lever 47 of the first form is modified and is represented as 47'. It is provided with an end 105 located beyond the rod 21'. This extremity 105 is snugly received in a recess 107 of the lock bar 79'. The walls 109 and 111 upstanding from the fork 25' are spaced to an extent greater than the walls of the opening 107 so that the lock bar 79' is moved to a limited extent before the fork and rod 21' are moved. Between the guide channels 113 and 115 in the casing for the rod and lock bar, the housing has a wall 117. In this wall is an opening having located therein a ball 119 of a diameter substantially equal to the thickness of the wall. At the opposite end of rod 21' are grooves 121 spaced to correspond with the axial positions of the rod for neutral, for second speed, and for high speed. To engage these grooves is a conventional spring detent indicated by numeral 103. In the vicinity of ball 119 the rod 21' has openings 125 which are equally distant from the ball 119 when the parts are in their neutral positions. Within the openings 125 are spring-actuated plungers 127. Similarly positioned in lock bar 79' are grooves 129, these grooves being spaced further apart than the openings 125. The difference in spacing is such that when the bar 79' is moved from its normal position one groove 129 will just register with a plunger 127 at the time that the clearance between the lever 47' and the arm 109 (or 111) has been taken up. Thereafter the lock bar and rod move together and the openings 125 and 129 will simultaneously move until they register with the ball opening. The spring-actuated plunger 127 will then push the ball 119 into the groove of the lock bar, the plunger 127 locking the rod 21' to the housing wall 117. From this position of locked engagement between the rod and the casing the rod may be moved only by a depression of the plunger 127 back into its opening 125. This is effected by the first movement of the lock bar under the influence of the lever 47', this first movement causing the ball to be pressed into the housing wall opening by its engagement with the sloping wall of the groove in the lock bar. In so doing the ball forces the plunger 127 down into the opening 125. When this has been accomplished the lever 47' has reached the one or the other of the arms 109 or 111. The shift may then be made as before to the other position of adjustment.

Figs. 9 and 10 show the positions of adjustment. Fig. 9 shows the parts in locked position for one driving ratio, and Fig. 10 shows the beginning of the return movement. It will be seen that the lock bar has been moved relatively to the rod and in doing so the ball has been pushed from the rod into the housing wall whereby the plunger has been pushed by the ball into the rod. From the position shown by Fig. 10, further movement will effect complete registration of the groove in the lock bar and the plunger opening. When this complete registration has been effected the lock bar and reciprocating rod move together until they jointly reach the position of the ball in the housing wall when the plunger again engages the casing and forces the ball into the lock bar.

Figs. 11, 12, and 13 show still another form which the invention may take. In this form the second and third speed fork 25" is moved relatively to the fixed rod 21". A spring-actuated ball 133 is located in the fork 25". It serves to locate selected positions of adjustment for neutral, second, and third speed by engaging notches 135 within the fixed rod 21". The lever 29' engages between arms 134 on an upward extension of the fork 25". It will be noted that the distance between the arms 134 affords a clearance which must be taken up before the fork is moved. Slidable axially relative to the fork is a lock bar 137. This bar has a notch 139 dimensioned to snugly fit the lower end of the lever 29' when moved transversely to engage the fork. It will therefore be seen that before taking up the clearance between the arms 134, the lever moves the lock bar. Within the fixed rod 21" is a spring-actuated plunger 141. This plunger is intended to enter one or the other of two straight-sided notches 143 within the fork 25" whereby the fork when in selected speed ratio positions may be locked to the rod. The lock bar has two notches 145 with curved walls. These notches are spaced somewhat further apart than the notches of the fork. If the fork is in its neutral position and if the lever is midway between the arms 134, the parts are substantially as shown in Fig. 12. If desired, there may be a further notch in the fork marked 146 on the drawings and there may be a shallow groove 148 in the lock bar, these parts serving to permit the plunger 141 to act as a spring detent for the neutral position. If now the shift lever is moved, it first moves the lock bar to a position in which its notch is in full registration with a notch of the shift fork. The two parts, the fork and the lock bar, thereafter move together. When the movement is sufficient for the plunger to enter the registering notches of the fork and bar the engagement of the plunger with the notch in the fork locks the latter to the fixed rod 21". Thereafter the parts can be moved only by the movement of the shift lever. The angular faces of the notches of the lock bar associated with the free limited movement between the lock bar and the shift fork permit the plunger to be forced back into the rod 21" at the beginning of the reverse movement of the lever. Upon a continuation of the movement of the lever the parts may be moved to and locked in the other position of adjustment.

Still another modification is shown by Figs. 14 and 15. This form shows a horizontally slidable rod 151 for shifting into second and high speed. The shifts to second and to high are effected by moving in opposite directions from the neutral position which may be that shown in Fig. 15. The casing has a plurality of notches 153 to engage a plunger 155 reciprocable in the shift rod 151. There may be three notches, a middle one for the neutral position of the rod, and end notches for third speed and second speed positions.

The shift lever 157 enters an enlarged space 159 having end walls 161. Within the space 159 the lever snugly engages a lock bar 163 which is slidable within the shift rod 151. The lever is operable to shift the lock bar prior to its engagement with the end walls 161 to shift the rod. A spring 165 is secured to the rod. Its arms engage the end of the lever 157 and hold the lever in its mid position in the space 159. The lock bar has two angularly walled notches 167 located adjacent each other. Between the notches there is a flat face 169 upon which the plunger may rest. When resting on this flat face 169 it is projected into one of the notches 153 of the casing. In a neutral position the shift rod is therefore locked by the plunger to the casing. If the lever is actuated it first moves the lock bar, due to the clearance between the end of the lever and walls 161 within the space 159, and the plunger 155 drops into one of the notches 167. In this way the rod 151 is disconnected from the casing. Thereafter the lever 157 engages one of the end walls 161 and both shift member 151 and the lock bar move together. The shift member 151 reaches its speed ratio position when the plunger 155 is opposite one of the end openings 153. Upon the release of the lever 157 the spring 165 restores the lever to its mid position in the space 159 and thereby moves the lock bar just sufficiently to push the plunger 155 from the notches of the lock bar and into engagement with the casing. In this way the shift rod 151 is locked not only in neutral but in both its gear ratio positions and from the several positions it may be moved only after the relative motion between the lock bar and the shift rod has been taken up.

In Figs. 16–20 inclusive is another form which the invention may take. In this form of the invention 301 represents the housing of the change speed transmission and 303 the cover. Through the cover projects shift lever 305.

Secured to the cover by fastening means 307 is a supporting plate 309 which is apertured as shown in Fig. 20. Mounted to slide longitudinally of the housing and on this plate 309 is a cam plate 311. This cam plate has three countersunk holes 313, 313′ and 313″ adjacent one edge. It has two openings 315 located as shown for the passage of the fork arms 317. It has a central opening 319 dimensioned to permit the lever end to move transversely for engaging either of the forks but also so dimensioned as to move longitudinally with all longitudinal movements of the lever.

Numerals 321 and 323 represent the two forks. One of them, fork 323, this being the fork for the high and second speed shifts, has three openings 325, 327, 329. Of these three openings 327 is chamfered and the end openings 325 and 329 are countersunk. Secured to the cover and located above the forks is the plate 331. This plate has a slotted formation as shown at 333 for the passage of the shift lever, and is provided with dividing plates 335. It has an opening 337 successively overlying openings 325, 327, and 329 as fork 323 moves longitudinally. It also has another opening 339 similarly related to recesses 341 of fork 321, the low speed fork. Also shown in the drawings, there is a spring-pressed plunger in the cover operable through opening 339 to engage in the recesses 341, this construction to serve as a detent to yieldingly hold the low speed fork in its several positions of longitudinal adjustment. No novelty is alleged for this detent device associated with the low speed fork.

The cover 303 has an opening 341′ for the reciprocation of a plunger 343 actuated by a spring 345. This plunger extends through the opening 337 and its lower end is formed with a cylindrical part 347 and a tapered part 349. Balls represented by numerals 351, 351′, and 351″ are used in the openings 325, 327, 329 and the cam plate openings thereunder.

The notch 353 of the fork 323 is so dimensioned that the lever 305 moves the cam plate to a limited extent before it engages this fork.

The end holes 313 and 313″ are spaced from the intermediate hole 313′ to a somewhat greater extent than are the end openings 325 and 329 from the middle opening 327 in the fork 323. This arrangement is well illustrated in Fig. 17.

To understand the operation of the device reference is made to Figs. 16–18. Fig. 17 shows the parts in a neutral position. The middle opening 313′ of the cam plate and the chamfered opening 327 of the high speed fork are in registration with the plunger 343. The ball 351′ is partly in the cam plate and partly in the fork. The balls 351 and 351″ only slightly project into the notches of the cam plate, owing to the greater distance of the end notches of the cam plate from the intermediate notch. The tapered end of the plunger engages the chamfered slot 327. As the lower end of the lever moves to the right the cam plate is moved before the lever picks up the fork. This first movement of the cam plate relative to the fork raises the ball 351′ from the cam plate into the fork opening, the plunger being thereby lifted from engagement with the fork. This movement also brings hole 313 into registration with 325. The lever thereafter moves the fork and the cam plate together. When the countersunk opening 325 and the hole 313 register with the plunger 343, the plunger is forced downwardly by its spring. The ball again is received into the hole 313 and the cylindrical part of the plunger engages the countersunk part of the fork whereby the fork is locked in position. Fig. 18 shows the parts in this locked position.

Fig. 19 shows the beginning of the movement from neutral toward a position the opposite of that shown by Fig. 18. In this figure the cam plate has moved to the left prior to the movement of the fork, and the hole 313 has been moved into registration with the countersunk opening 325. From the position of the parts shown in Fig. 19 a continued movement of the lever will move the now registering openings 329 and 313 to a position where they may be engaged and the fork locked by the plunger as before.

I claim:

1. In combination, a casing, a first member movable to do work, a second member, operating means having a snug fit with the second member and a lost motion connection with the first member, spring-actuated means locked to lock said first member to said casing, said second member having angularly formed walls to dislodge said locking means from engagement with both casing and first member during the movement of the second member relative to the first member by the operating means.

2. The invention defined by claim 1, said locking means between the first member and casing comprising a plunger in one of said members, said plunger having its external wall parallel with its longitudinal axis, and a notch in the other of said members, said notch shaped and dimensioned to fit said plunger.

3. In a change speed transmission including a casing, a first movable ratio changing member, a second member having a limited movement relative thereto, a spring-actuated plunger operable between a part rigid with said casing and said first member, said second member formed to move said plunger completely from its position in engagement with the casing part and the first member during its movement relative to said first part.

4. In a change speed transmission having a casing element, a reciprocable shift fork element, a spring-pressed plunger in one of said elements movable into positive locking engagement with said other element, said shift fork element having an elongated slot, a lock bar slidable in said slot, an operating member snugly engaging said lock bar and having a lost motion connection with said fork element, said lock bar having an angularly faced formation to push said plunger from engagement with both elements during the period of relative movement between the shift fork element and the lock bar.

5. In a change speed transmission having a casing element, a reciprocable shift fork element, a spring-pressed member in said casing element, said fork element having spaced notches shaped to admit said member into said fork and lock the fork element to said casing element in positions of the fork element corresponding to positions of the transmission members effecting predetermined driving ratios, a lock bar having notches with sloping walls, said notches being spaced further apart than the notches of the fork element, operating means to reciprocate the lock bar and having a snug fit therewith, there being a lost motion connection between the fork element and said operating means whereby the taking up of the lost motion effects registration between the notches of the fork and lock bar.

6. In a change speed transmission including a casing, a shift fork element, a lock bar arranged in parallelism therewith, said casing having a wall between said elements, said wall having an aperture therein and a movable member in said aperture, spaced spring-pressed plungers in said shift fork element, said lock bar having grooves spaced apart somewhat further than said plungers, operating means snugly engaging said lock bar, said operating means having a lost motion connection with said shift fork element whereby, upon taking up said lost motion, one of said grooves may register with one of said plungers to the end that when said registering parts also register with said movable member in the aperture of the wall, said movable member may enter the groove of the plunger and the plunger may lock the fork member to the casing wall.

7. In combination, actuating means, a shifting element having a lost motion relative thereto, a lock bar slidable relative to said shifting element and snugly engaging said actuating means, a relatively-fixed wall having a plurality of notches therein, said shifting element having a passage to register with any one of said notches, a locking element in said passage, said lock bar having a pair of adjacent notches with a peripheral surface therebetween, and yielding means between said operating means and said shifting element to normally hold said operating means in the mid position of the lost motion connection and said locking element in locking engagement with both the wall and the shifting element.

In testimony whereof I affix my signature.

ALBERT E. LEACH.